United States Patent
Gehm et al.

[11] Patent Number: 6,045,331
[45] Date of Patent: Apr. 4, 2000

[54] FLUID PUMP SPEED CONTROLLER

[76] Inventors: William Gehm, 149 Abbott Rd.; Lanny Gehm, 9502 Rte. 79, both of Lisle, N.Y. 13797

[21] Appl. No.: 09/131,633

[22] Filed: Aug. 10, 1998

[51] Int. Cl.⁷ .................................................. F04B 41/06
[52] U.S. Cl. .............................. 417/2; 417/44.2; 417/45
[58] Field of Search .......................... 417/2, 44.2, 45

[56] References Cited

U.S. PATENT DOCUMENTS

| | | | |
|---|---|---|---|
| 3,817,658 | 6/1974 | Murase | 417/2 |
| 5,141,403 | 8/1992 | Gou et al. . | |
| 5,158,436 | 10/1992 | Jensen et al. | 417/45 |
| 5,165,864 | 11/1992 | Burger et al. | 417/2 |
| 5,182,826 | 2/1993 | Thomas et al. | 417/44.2 |
| 5,259,731 | 11/1993 | Dhindsa et al. | 417/45 |
| 5,284,180 | 2/1994 | Guo et al. . | |
| 5,580,221 | 12/1996 | Triezenberg | 417/44.2 |
| 5,613,514 | 3/1997 | Tan et al. . | |
| 5,746,581 | 5/1998 | Okumura et al. | 417/44.2 |
| 5,971,711 | 10/1999 | Noji et al. | 417/2 |

FOREIGN PATENT DOCUMENTS

| | | | |
|---|---|---|---|
| 0 209 499 | 1/1987 | European Pat. Off. | 417/2 |
| 0 308 846 | 3/1989 | European Pat. Off. | 417/2 |
| 2 200 487 | 7/1973 | Germany | 417/2 |
| 56-81288 | 7/1981 | Japan | 417/2 |

*Primary Examiner*—Erick R. Solis
*Attorney, Agent, or Firm*—Salzman & Levy

[57] ABSTRACT

A fluid pump speed controller apparatus for ensuring adequate system fluid pressure while minimizing energy consumption. The fluid pump speed controller has an adjustable frequency motor drive and control circuits to vary fluid pump motor speeds based on system fluid demand, monitored by a sensor. The control circuits set the pump speed, based on input from the sensor. The control circuits also set parameters in the control circuit logic, and are capable of self calibration and controlling multiple fluid pumps.

14 Claims, 7 Drawing Sheets

FLUID PUMP SPEED CONTROLLER

FIELD OF THE INVENTION

The present invention pertains to an improved variable speed fluid pump controller and, more particularly, to a self-calibrating controller that requires minimal energy consumption and provides minimum speed variation.

BACKGROUND OF THE INVENTION

Typical fluid systems comprise a pump to move fluid and a regulator to maintain safe and desirable operating pressures. One particular application is a vacuum pump and regulator that form part of a fluid system to provide vacuum for milking cows.

In general, two basic types of fluid systems are used for providing the vacuum for milking cows. The first is a vacuum pump operated at a constant speed with a regulator that admits atmospheric air to limit and control the vacuum level of the system. This type of system provides excess capacity, resulting in wasted energy.

The second type of system has addressed the excess capacity problem by incorporating a variable speed motor and drive to limit the speed of the vacuum pump. This type of system relies on a pressure sensor to monitor the vacuum level and adjust the speed of the motor and vacuum pump to match the load requirements of the milking system. The disadvantage of this type of system is that the motor and vacuum pump speed must be monitored continuously and varied to provide adequate vacuum stability. This results, among other things, in additional mechanical wear on the vacuum pump and motor. Variation in the speed of the motor also produces undesirable voltage variations for the electrical power system and electromagnetic waves that can interfere with other electronic systems in use. The variation in speed also wastes electricity when the motor speed must be increased suddenly to meet the demands of a transient load condition.

In U.S. Pat. No. 5,141,403 issued to GUO et al., a low-energy-consuming apparatus and method for controlling vacuum levels in machine milking and other vacuum systems is illustrated wherein the apparatus comprises a low vacuum end and high vacuum reserve. The apparatus further comprises a first and second controller means. Upon sensing disturbances in the low vacuum end, the flow rate of air is adjusted to the high vacuum reserve. The vacuum in the milking system is maintained by air supplied to the pump substantially from the low vacuum end rather than from external air.

In U.S. Pat. No. 5,284,180 issued to GUO et al., a low-energy-consuming apparatus and method for controlling vacuum levels in machine milking and other vacuum systems is shown, comprising a first and second controller means. This apparatus performs essentially the same functions as the above-mentioned GUO et al. patent in substantially the same way.

In U.S. Pat. No. 5,613,514 issued to TAN et al., a pressure regulator apparatus and method for controlling the pressure in a pressure system is illustrated. A regulator control circuit compares the pressure measured to a predetermined set point value for maintaining pressure. The desired pressure is maintained by opening and closing a control valve by the regulator.

The present invention seeks to improve fluid pump systems. The invention reflects the discovery that a variable speed motor may be controlled by a controller with discrete speed settings to minimize energy and speed variations. The invention relies on an independent pressure regulator to provide the desired pressure operating level. Such a pressure regulator for a milking system admits atmospheric air to maintain the vacuum at a desired operating level. The pressure regulator reduces the admission of atmospheric air during transient conditions of increased system demand. The system operating level is monitored and the variable motor speed is adjusted to a predetermined, discrete speed setting, as required to provide adequate margin for the regulator to properly maintain the operating level, while limiting excess capacity to that required for occasional transient conditions.

The present invention has a self calibration feature that determines the discrete speed settings for a particular system. This is accomplished by placing the inventive controller in calibration mode, which results in the pump being operated initially at its maximum speed. The controller then determines the system operating pressure level and incrementally decreases the pump speed until the system operating pressure level begins to decrease. The minimum speed, as well as any desirable speed setting(s) between the minimum and the maximum, can be specified by the controller. The desired minimum speed can also be set independently. This feature is required for milking system vacuum pumps that have a minimum allowable operating speed.

The present invention can provide control for a variety of system configurations. Although the basic system is one in which a single pump is used, the invention can self calibrate and control multiple pumps, only one pump operating at a given time or more than one pump operating simultaneously.

The inventive design is not obvious from the teachings of the prior art. Numerous variable speed pump controllers have been designed that rely on the speed of the pump to provide adequate operating system pressure levels. The present invention minimizes energy consumption while also minimizing variations in pump speed.

SUMMARY OF THE INVENTION

In accordance with the present invention, there is provided an improved fluid pump speed controller that features discrete speed settings and self calibration to provide speed control for one or more fluid pumps. One particular application for the inventive controller is to minimize energy consumption of a vacuum pump in a milking system. The controller can be utilized in a variety of applications in which a fluid system is subject to occasional or periodic changes in fluid demand. An adjustable frequency drive is provided for a variable speed electric motor, a sensor and a control circuit.

The present invention has three speed set points. The first set point is the minimum speed required to satisfy the milking system air flow requirements during normal milking operation. The second set point is midway between the first set point and the maximum speed for the electric motor. This second set point provides for increased air flow during occasional transient conditions in the milking system. The third set point is the maximum speed for the electric motor.

It is an object of this invention to control the speed of an electric motor to provide operation at discrete settings based both on an initial self calibration and on information from the sensor during system operation.

It is another object of the invention to provide speed control for one or more electric motors operating one at a time or simultaneously.

It is another object of the invention is to provide an improved fluid pump speed controller that minimizes energy consumption.

It is another object of the invention to reduce pump and motor wear by reducing operating speed and variation.

It is another object of the invention to provide proper control following a transient power interruption.

It is another object of the invention to provide maintenance information to the user indicating that the vacuum level is out of limits for a sustained period and that periodic maintenance of the milking system is due.

It is still another object of the invention to maintain system vacuum level within 0.2" Hg of the level measured at time of calibration or as recalculated during the beginning of each start up period.

It is yet another object of this invention to reduce the power system voltage variations and electromagnetic interference of a milking system pump and motor by minimizing speed variations.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention pertains to a fluid pump speed controller with a circuit card that receives system operating pressure information from a suitable sensor. The controller provides a control signal to an adjustable frequency drive that provides electrical power to a variable speed motor connected to a fluid pump. The circuit card contains a self calibration feature which determines the appropriate system operating parameters. The circuit card can provide a control signal to one or more adjustable frequency drives. The circuit card can update the discrete speed set points during normal operation to ensure that both energy consumption and speed variations are minimized.

Figure 1:
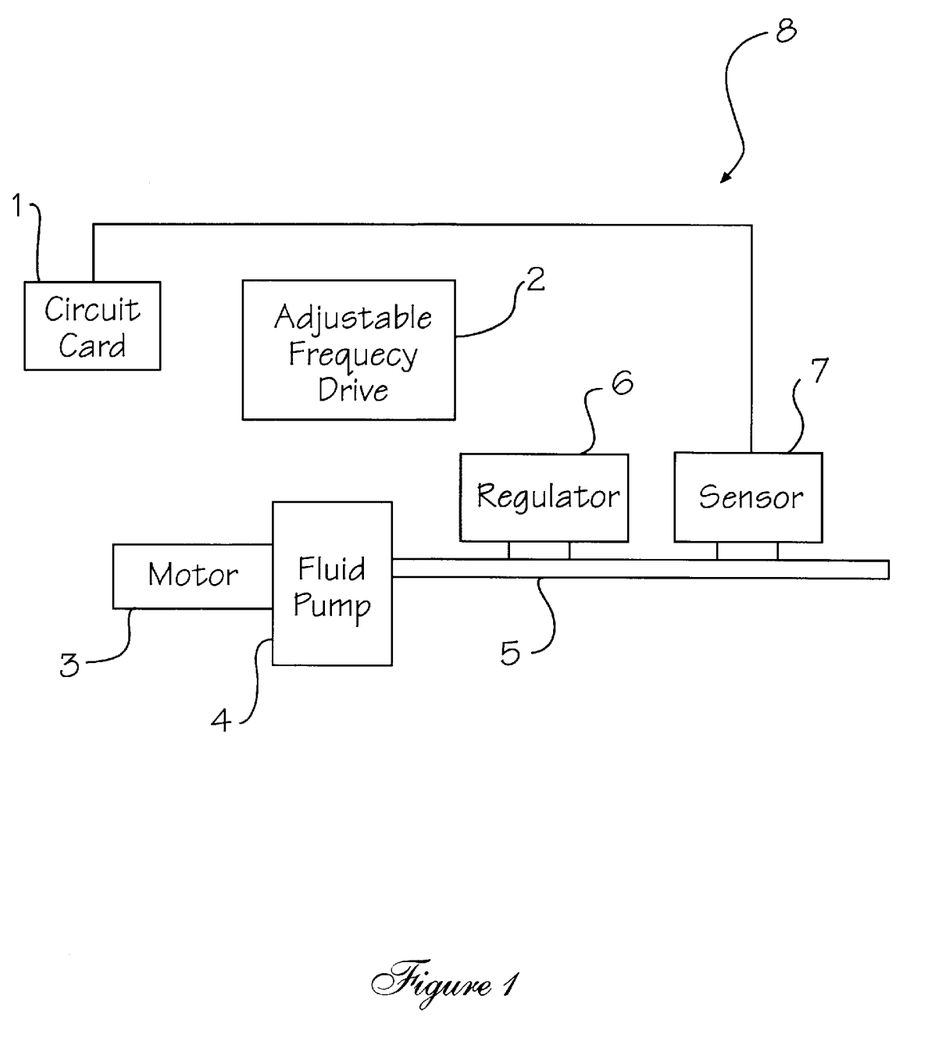
FIG. 1 is a diagram of the fluid system in accordance with the present invention.

Referring now to FIG. 1, a fluid pumping system 8 is shown in block diagram form. A fluid pump 4 is driven by an electric motor 3 in a fashion well known in the art. The fluid pump 4 is connected to a fluid pipe or conduit 5 which contains fluid, not shown, moved by the fluid pump 4. The pressure in the fluid pipe 5 is regulated by a pressure regulator 6. The pressure in the fluid pipe 5 is measured by a sensor 7, which is monitored by a fluid pump speed controller circuit card 1. As discussed in greater detail hereinbelow, the fluid pump speed controller circuit card 1 provides an electrical signal to an adjustable frequency drive 2 indicating the desired speed of the electric motor 3.

Figure 2:
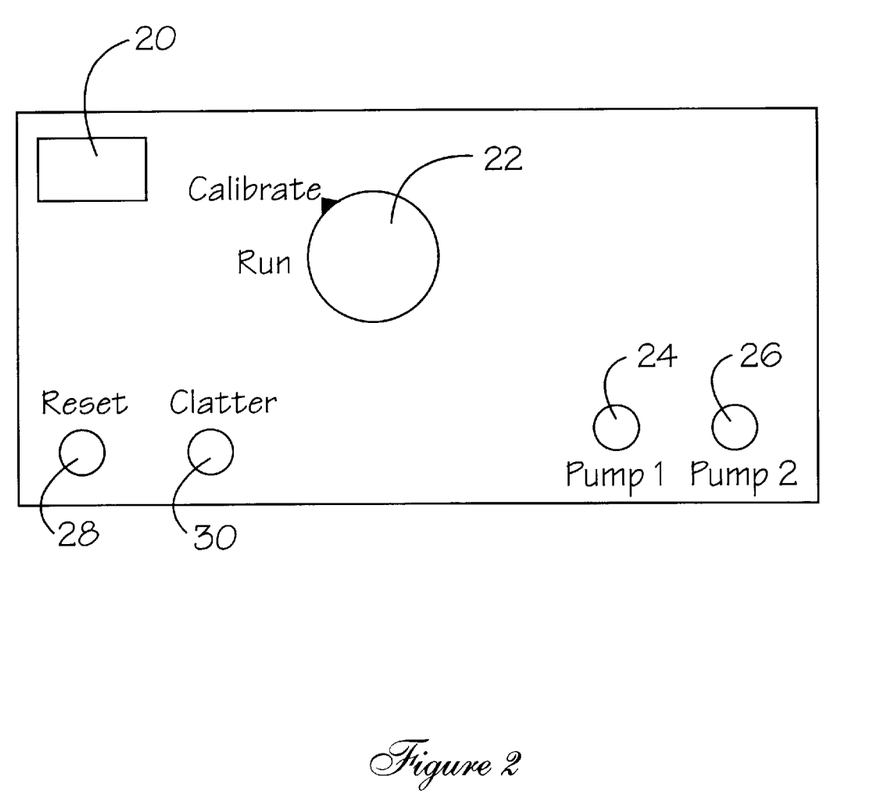
FIG. 2 is the preferred embodiment of the control panel used by an operator in accordance with the present invention.

Referring now also to FIG. 2, illustrated is the control panel as seen by an operator. A visual indicator 20 is lit when the controller has determined the set points, or maintenance is needed, or a malfunction has occurred. A switch 22 is used to select calibration mode or run (operation) mode. Buttons 24 and 26 indicate the pump in use (e.g., Pump 1 or Pump 2). When these buttons 24, 26 are depressed by the operator, individually to indicate which pump is to be used or at the same time to indicate that both pumps are to be used. A reset button 28 can be pressed if the operator desires to reset the system vacuum level. Finally, a clatter button 30 is provided which can be pushed by the operator when clatter is detected.

Figures 3, 3A:
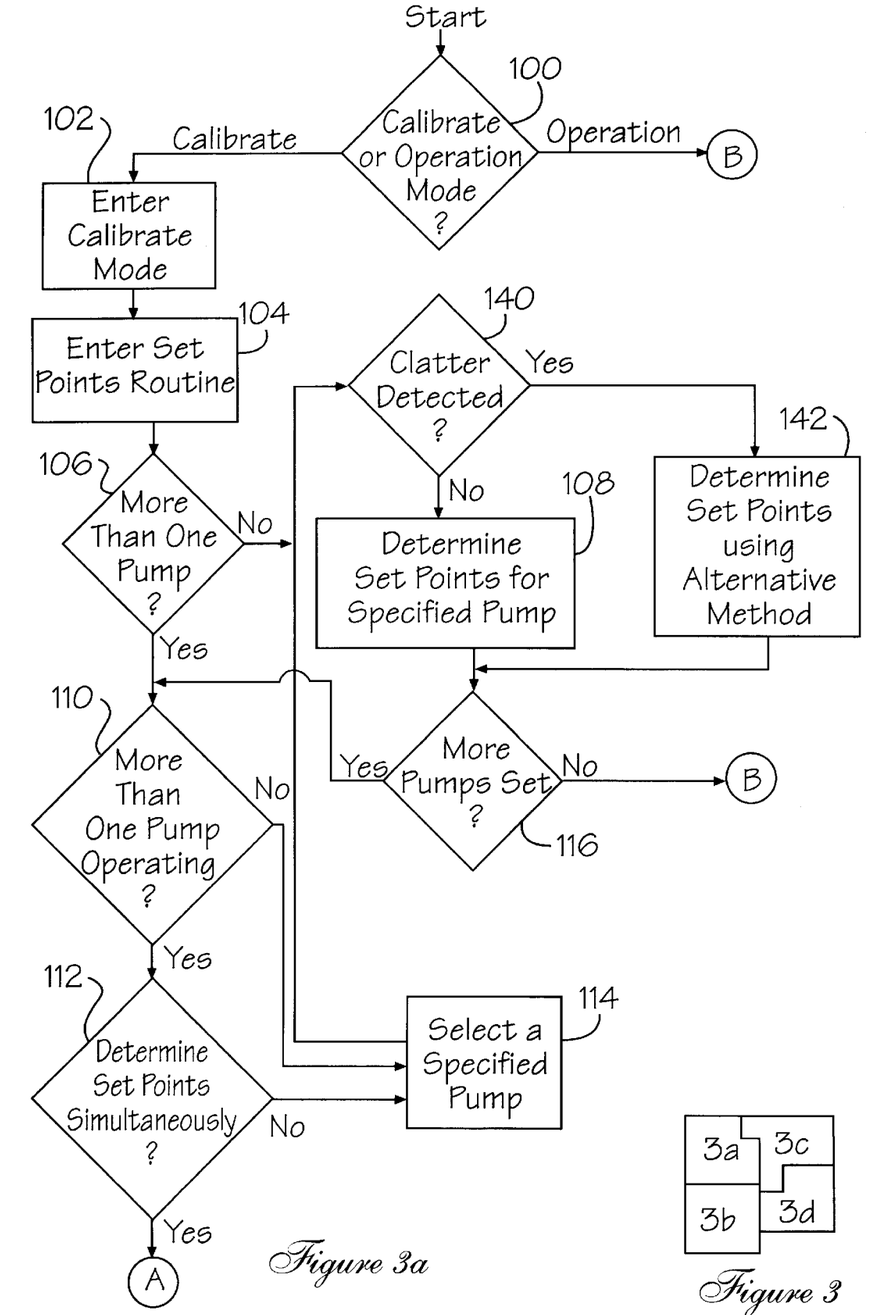
FIG. 3 is a flow chart of calibration and operation of the fluid system of FIG. 1.
Figure 3B:
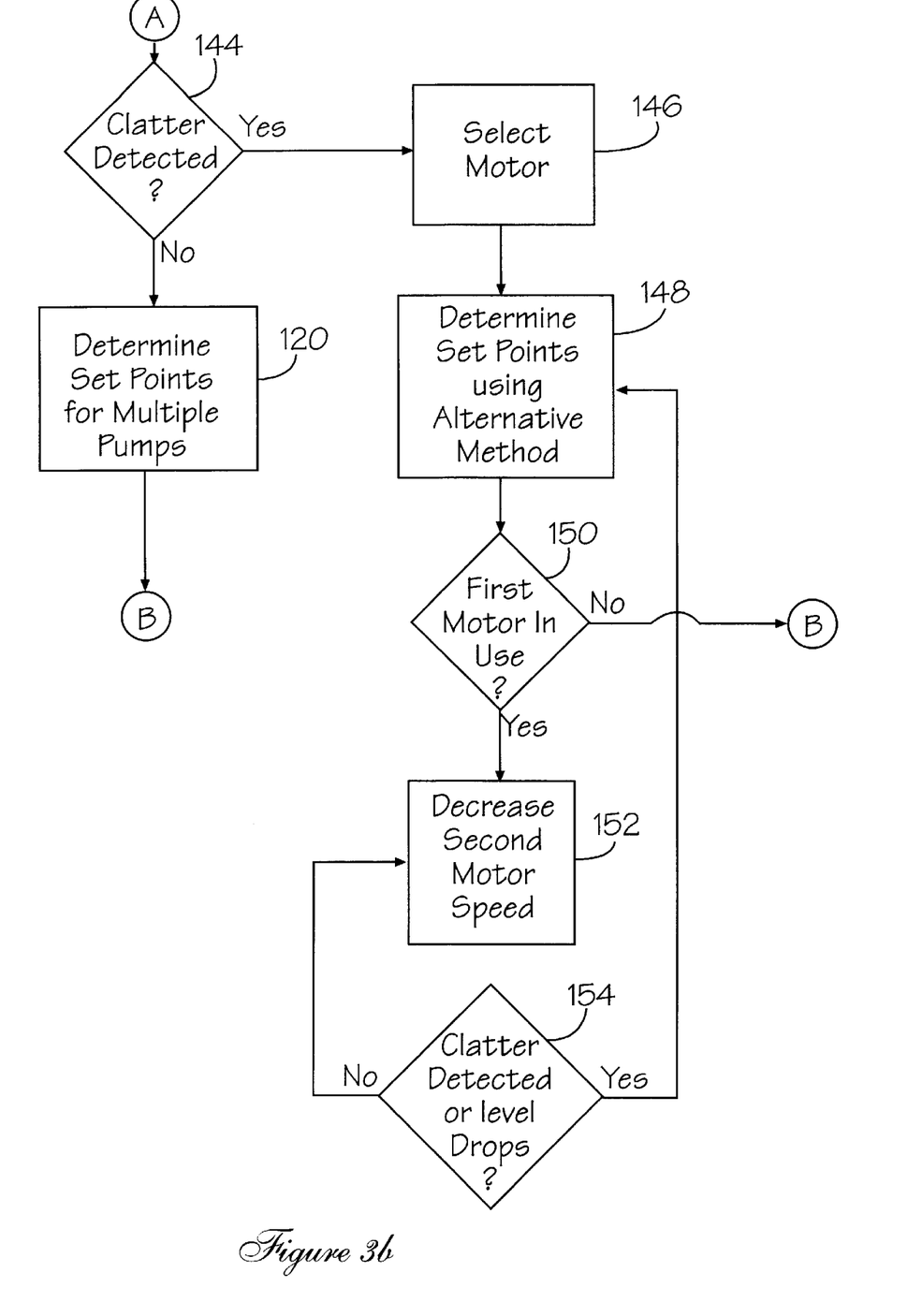
Figure 3C:
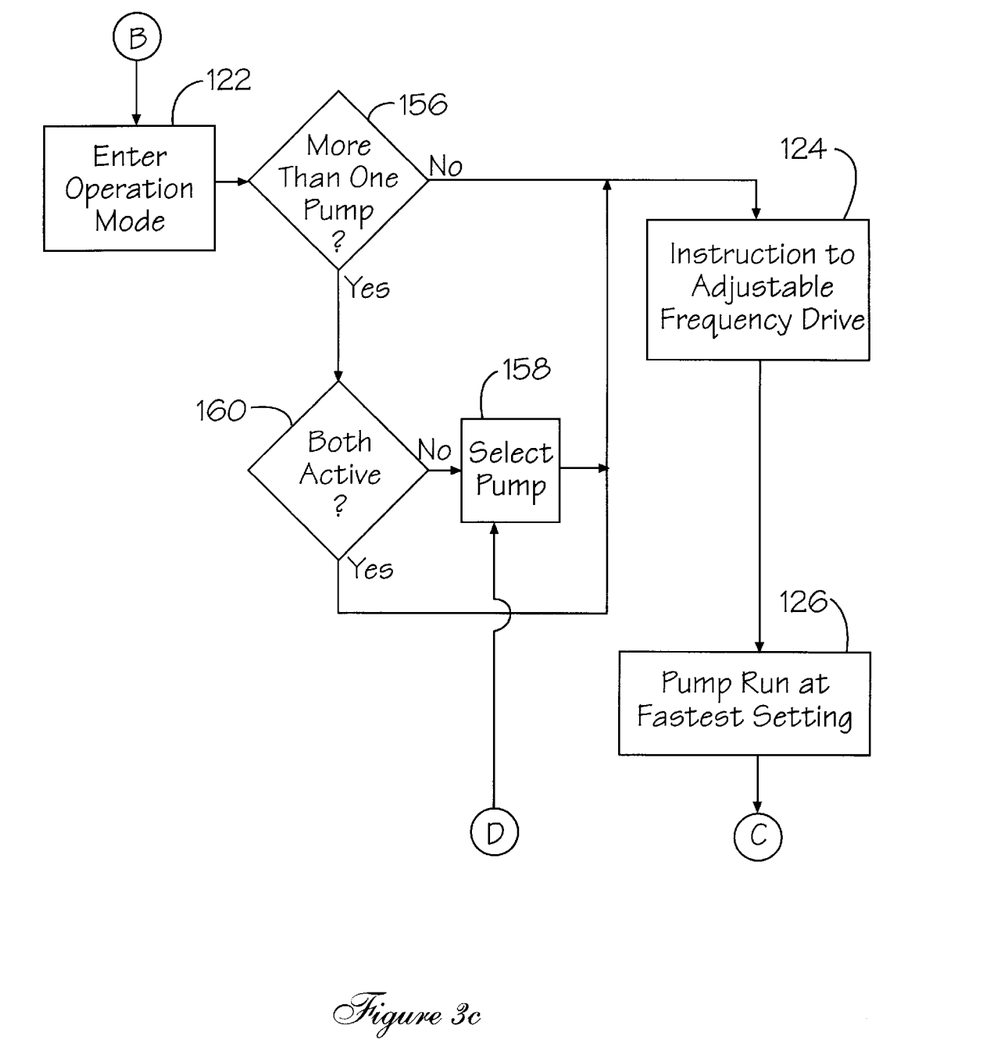
Figure 3D:
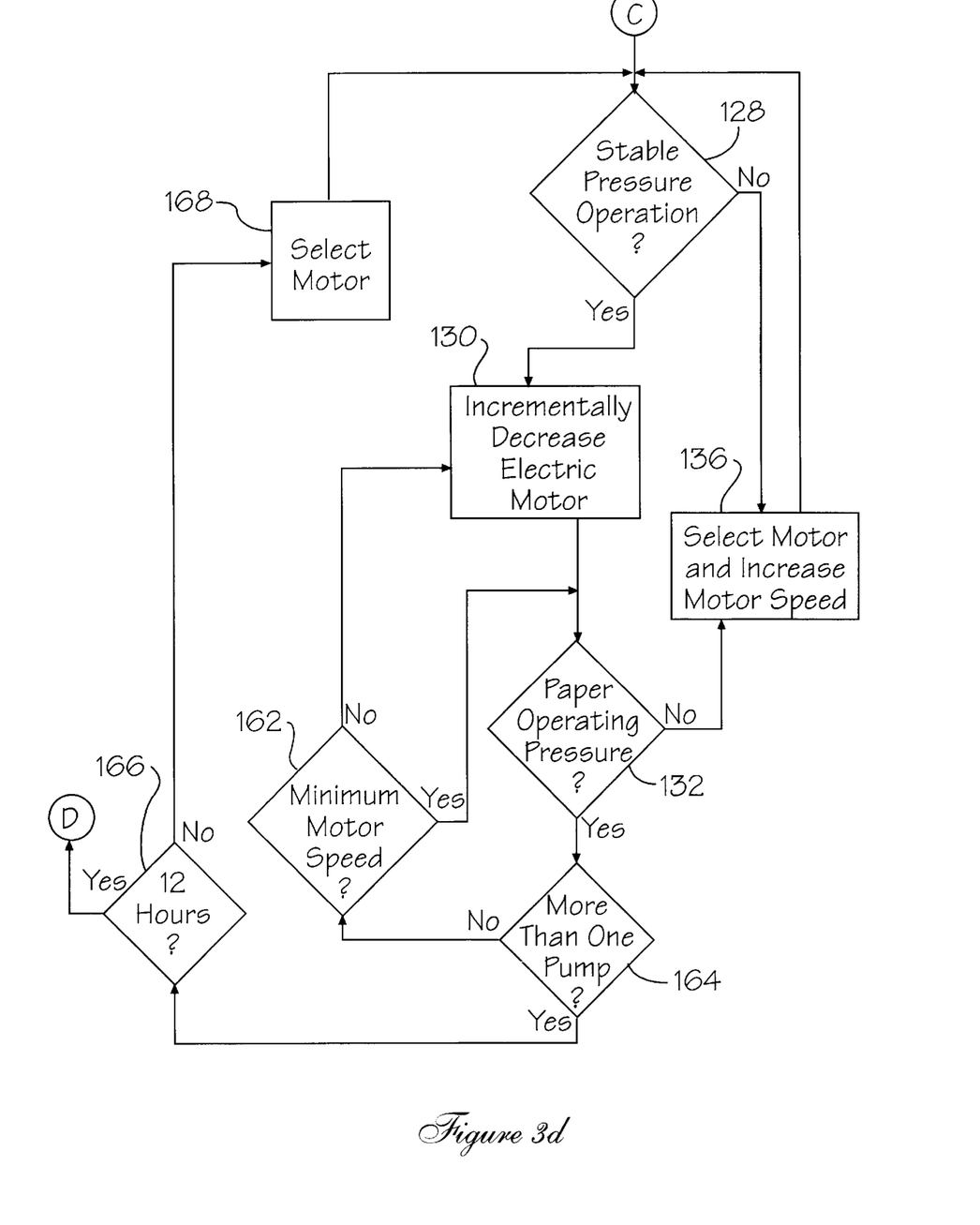

Referring now also to FIG. 3, there is shown a flow chart of system operations. The operator determines whether the system is to run in calibration or operation mode, step 100. If the system program residing on circuit card 1 is initially placed in calibration mode, step 102, a discrete set of points of at least one of the fluid pumps 4 (FIG. 1) is determined, step 104.

There may be only one fluid pump 4 (FIG. 1), step 106, in which case its set points are determined, step 108. The motor is instructed to run at full speed until the vacuum sensor 7 (FIG. 1) indicates that the vacuum level has stabilized (i.e., remains constant within 0.3" Hg for 10 seconds). The system then calculates the system vacuum level and stores it as the calibrated value and the system level. The motor is slowed down in 1 Hz increments at a rate of 1 increment per 10 seconds until the vacuum level drops 0.2" Hg. The first set point is calculated to be 5% faster than the speed resulting in the 0.2" Hg drop in the vacuum level. A second set point is calculated midway between the first set point and the maximum speed of the motor. When the controller has determined the set points, a visual indicator 20 (FIG. 2) is provided to the operator. The motor speed is set to run at the first set point, after which the operator can use switch 22 (FIG. 2) to select run mode.

If more than one fluid pump, not shown, is present in the system, step 106, the system determines whether more than one of them is presently operating, step 110. If only one fluid pump 4 (FIG. 1) is operating, its set points are determined, step 108. The procedure for calibration is the same as the single pump operation except the operator must indicate to the controller which pump is being calibrated, step 114. When the first pump is finished calibrating, the operator depresses a button 26 (FIG. 2) to calibrate the second pump, step 108. The first pump is turned off and its relay is opened. The relay for the second pump is closed and the second pump is then turned on. The procedure for calibrating the second pump is the same as that for the first pump. When the controller has completed the calibration of the second pump, the operator, via switch 22 (FIG. 2), selects run mode. The second pump continues to run.

If, however, more than one pump is operating, step 110, the system determines whether set points should be determined simultaneously, step 112. If not, a specified, single pump is selected, step 114, and its set points are determined, step 108. If set points for multiple pumps are to be set, step 112, however, all of such pumps are handled and assigned set points, step 120. In this case, the calibration procedure requires that both pumps be turned on and calibrated simultaneously.

The system is calibrated differently if clatter is detected. If the operator detects clatter (in a single pump system) in the vacuum during the calibration process, step 140, input can be provided to the controller by the operator pressing a button 30 (FIG. 2). The current speed of the motor is then used to determine the first set point. The first set point is calculated to be 10% faster than the current speed of the motor, step 142.

In the case of two pumps, one pump being active, if clatter is detected in either pump during the calibration process, step 140, the operator can perform the same steps used to calibrate a single pump experiencing clatter, step 142.

In the case of two pumps, when both vacuum pumps are active, if the operator detects clatter in a pump during the calibration process, input can be provided by the operator, step 144, to the controller by pressing a button to indicate which motor (hereinafter the first motor) is experiencing clatter, step 146. It should be understood, however, that the process detecting clatter and performing operations responsive thereto can be automated without departing from the scope of the invention. The current speed of the first motor associated with the clattering pump is then used to determine the first set point for that first motor. The first set point is calculated to be 10% higher or faster than the current speed of that first motor, step 148. The controller continues to slow the speed of the second motor, step 152, until either the system vacuum level drops 0.2" Hg or there is an indication of clatter, step 154. The set points for the second motor are determined as previously defined for the first motor, step 148. When the second motor has been calibrated, switch 22 (FIG. 2) can be turned to select operation mode, step 122. Again, such transition to operation mode may also be performed automatically in one of several manners known in the art.

Following calibration, the system can be placed in operation mode, step 122. If more than one pump is in operation, step 156, the system determines whether both pumps or one pump are in operation, step 160. If only one pump is active, the active pump is selected for control, step 158.

Single pump

The system instructs the adjustable frequency drive 2 (FIG. 1), step 124, which in turn causes the electric motor 3 (FIG. 1) to run the pump 4 (FIG. 2) at the fastest setting, step 126. After 15 seconds of the vacuum remaining constant within 0.3" Hg, the fluid system achieves stable pressure operation, step 128. Then the system incrementally decreases the electric motor speed to the second set point, step 130. If the vacuum remains at the proper system level for 15 seconds, step 132, the motor speed is reduced by the controller to the slowest discrete setting, step 130, while ensuring proper operating pressure of the fluid system 8 (FIG. 1), step 132. The motor speed is decreased until it is at its minimum operating speed, step 162.

After 5 minutes of operation, the controller monitors the vacuum level for 30 seconds and determines the average value, step 132. If the vacuum level does not deviate more than 0.3" Hg throughout the 30 second period, the average value becomes the new system level. The calibrated vacuum level remains unchanged. If the new system level is different from the calibrated level by more than 0.5" Hg, step 132, a visual indicator 20 (FIG. 2) is lighted. The operator can press a reset button 28 (FIG. 2) to reset the system vacuum level to the calibrated level. If the reset button 28 (FIG. 2) is pressed twice within 5 seconds, the controller does not attempt to calculate a new system level again after the first 5 minutes of operation. Further, the controller can be initiated to calculate a new system level if it is placed back into calibration mode to fully recalibrate.

When the vacuum level falls more than 0.5" Hg from the calculated system level for 0.5 seconds, step 132, the controller increases the motor speed to the second set point, step 136. If the vacuum level returns to the system level in 2 seconds and remains within 0.2" Hg for a continuous 15 seconds of operation, step 128, the controller decreases the motor speed to the first set point, step 130.

The controller increases the motor speed to the maximum speed, step 136, if the system vacuum level fails to return to the system level in 2 seconds, step 128. Following 15 seconds of correct system vacuum level, step 128, the controller decreases the speed to the second set point, step 130. The 15 second waiting period is increased to 30 seconds if a wash cycle discrete is set.

The wash cycle discrete is a binary electrical signal to indicate if the milking system is in the wash mode. It is most likely a 115 VAC signal when the system is in the wash mode and a 0 VAC signal when the system is in the milk mode. This prevents the controller from adjusting the motor speed too frequently or from changing the set points based on the increased frequency of the motor speed changes. The vacuum usage required during the wash mode is generally significantly greater than that required during the milk mode. This is due to the pulsed admission of atmospheric air to create slugs of water to thoroughly wash the pipes that transport the milk. The slugging action results in rapidly varying vacuum levels that could confuse the controller. The optional use of the wash cycle discrete is a means of informing the controller that the vacuum variation is a result of washing and not a trend that must be adjusted for by changing the speed set points.

If the controller increases the motor speed, step 136, from the first to the second set point at a frequency greater than 2 times in 10 minutes, the controller increases the first set point by 0.5 Hz. However, the controller decreases the motor speed of the first set point by 0.5 Hz if the frequency of speed change occurrences is fewer than 1 per 30 minutes. It should be noted that the speed cannot be decreased below the calibration speed if a clatter indication was set during calibration.

Two pumps, one active

The controller controls the active pump in the run mode the same as it does for the single pump case. The second pump is a spare which should not remain unused for extended periods of time. Therefore, it is desirable to use the two pumps in an alternating fashion. An additional job of the controller is to record the total run time of the active pump, step 166. When both the run time reaches 12 hours, step 166, and more than one pump is known to be in use by the controller, step 164, the controller reassigns the backup pump to become the active pump, step 158. Therefore, the next time the system is turned on, the backup pump becomes the active pump.

The active pump must be off for 5 seconds in order to switch to the other pump. This prevents a switch from occurring during a power transient. The controller must allow the relay for the chosen motor to close prior to applying power to that motor.

Two pumps, both active

The controller instructs the adjustable frequency drive, step 124, to start both motors at full speed, step 126, until stable pressure is reached, step 128. The speed of one motor is decreased, step 130, to its second set point after 15 seconds of the vacuum remaining at the proper system level, step 128. The controller chooses the second motor, step 168, and reduces its speed to its second set point, step 130, after 15 seconds of the vacuum remaining at the proper system level, step 128. Now, the controller selects the first motor, step 168, and reduces the speed to its first set point, step 130, after 15 seconds of a steady vacuum level, step 128. Finally, the speed of the second motor is reduced to its first set point, step 130, after maintaining proper vacuum level for 15 seconds, step 128.

The controller determines if the vacuum level falls more than 0.5" Hg for 0.5 seconds, step 132. If so, the pressure is too low and the controller increases the motor speed of the first motor to the second set point, step 136. If the vacuum level returns to the system level in 2 seconds, step 128, the controller decreases the motor speed of the first motor to the first set point, step 130. However, if the system vacuum level fails to return to the system level in 2 seconds following the increase to the second set point, step 128, the controller increases the motor speed of the second motor to its second set point, step 136.

The controller decreases the motor speed of the second motor to the first set point, step 130, after 10 seconds of operation at the system level if the vacuum level returns to the system level in 2 seconds, step 128. The controller decreases the speed of the first motor, step 130, after 10 seconds of proper vacuum level, step 128. If the vacuum level has not returned to the correct level within 2 seconds of the second motor speed being increased to the second set point, step 132, the first motor speed is increased to its maximum speed, step 136. The same logic continues for either increasing the speed of the second motor to its maximum speed or to return one of the motors to a lower speed as dictated by the system vacuum level.

The system increases electric motor speed to the next faster discrete speed setting, step 136, if the system pressure falls below acceptable limits, step 132. Conversely, the system decreases electric motor speed to the next slowest discrete speed setting, step 130, if the system pressure falls below acceptable limits, step 132. The system either increases or decreases the electric motor speed to the next speed setting depending on the system pressure detected by the sensor 7 (FIG. 1).

The system incrementally changes the electric motor speed or alternate electric motors 3 (FIG. 1) if more than one is in operation. The system monitors the number of speed changes in a given time period and automatically adjusts the discrete speed settings to achieve an appropriate number of speed changes per unit of time.

Figure 4:
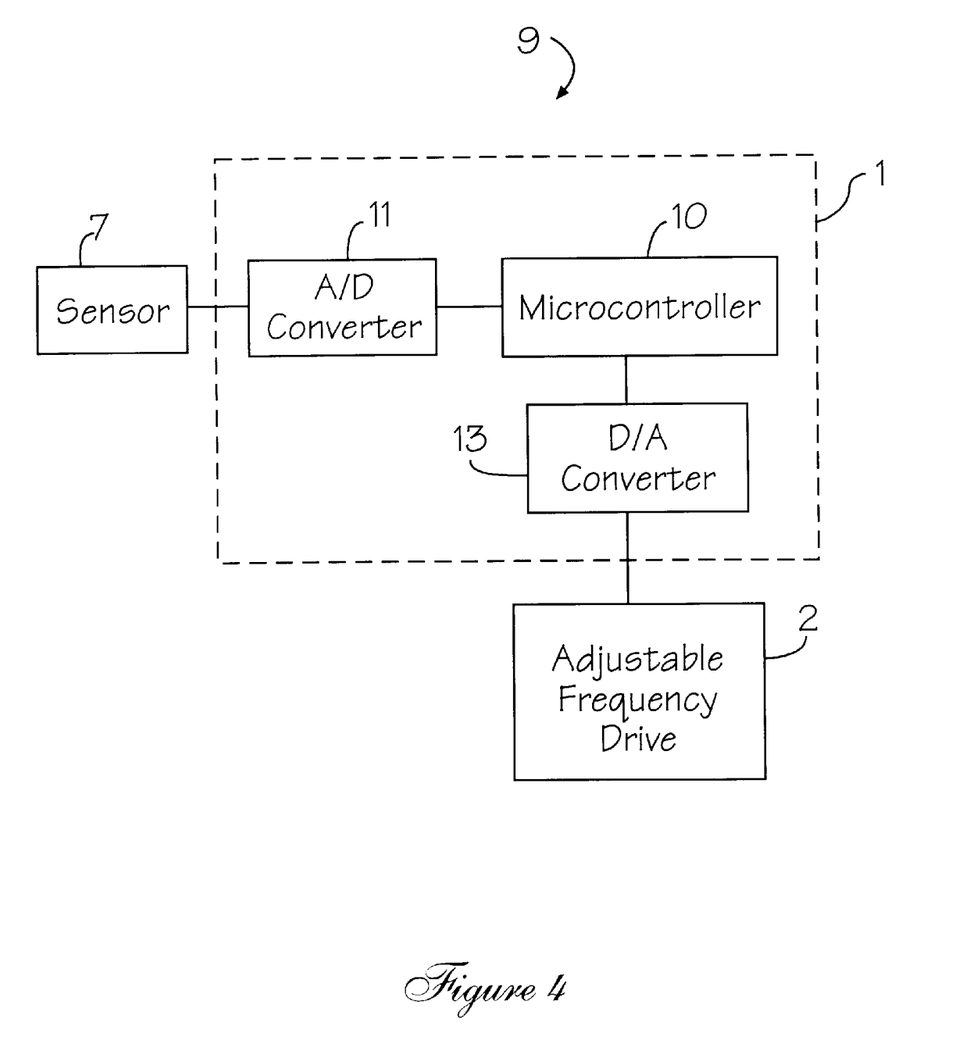
FIG. 4 is a block circuit diagram of the control circuit embodied in the circuit card of FIG. 1.

Referring now to FIG. 4, the circuit diagram for the control circuit 9 of the fluid pump speed controller is shown. A sensor 7 provides an electrical signal representative of the fluid system pressure. The analog electrical signal from sensor 7 is first converted to a digital signal by an A/D converter 11 before being applied to a microcontroller 10. The microcontroller 10 is programmed with software to evaluate the electric signal corresponding to the system pressure. The microcontroller 10 provides a digital electrical signal to a D/A converter 13, which then converts the signal to an analog electrical signal and applies it to adjustable frequency drive 2, which signals the electric motor 3 (FIG. 1) to run at the required motor speed to maintain the system pressure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claim.

What is claimed is:

1. A motor speed controller for operating at least one pump at discrete speeds while minimizing energy and speed variations, comprising:
   a) an electric motor;
   b) means operatively connected to said motor for controlling the speed thereof, said motor controlling means comprising means for setting at least one set point representative of the maximum speed of said motor; and
   c) an adjustable frequency drive operatively connected to said motor controlling means and to said motor for applying a signal representative of said controlling means to said motor.

2. The motor speed controller in accordance with claim 1, further comprising means for setting set point representative of a minimum speed of said motor.

3. The motor speed controller in accordance with claim 1, wherein said motor controlling means is adapted to set the speed of multiple pumps at various discrete values.

4. The motor speed controller in accordance with claim 3, wherein said multiple pumps are controlled individually or simultaneously by said motor controlling means.

5. The motor speed controller in accordance with claim 3, wherein said discrete values are automatically calculated.

6. The speed controller in accordance with claim 5, wherein said discrete values are automatically calculated during normal operation.

7. A method of calibrating at least one fluid pump speed controller, the steps comprising:
   a) determining whether more than one fluid pump is operational; and
   b) if only one fluid pump is operational, setting points on a fluid pump speed controller operatively connected to said fluid pump, said set points being representative of maximum and minimum operating speeds of said fluid pump.

8. The method of calibrating at least one fluid pump speed controller in accordance with claim 7, the steps further comprising:
   c) if more than one fluid pump is operational, setting points on a fluid pump speed controller operatively connected to said more than one fluid pump, said set points being representative of maximum and minimum operating speeds of said more than one fluid pump.

9. The method of calibrating at least one fluid pump speed controller in accordance with claim 8, the steps further comprising:
   d) detecting clatter of at least one of said more than one fluid pump.

10. A method of operating at least one fluid pump speed controller, the steps comprising:
    a) determining whether more than one fluid pump is operational;
    b) if only one fluid pump is operational, driving said fluid pump at its maximum operating speed;
    c) decreasing the operating speed of said fluid pump when said system reaches a first stable pressure level;
    d) continue decreasing the operating speed of said fluid pump to the minimum operating speed thereof when said system reaches a second stable pressure level; and
    e) adjusting the operating speed of said fluid pump if the system pressure is out of a predetermined range of pressure.

11. The method of operating at least one fluid pump speed controller in accordance with claim 10, wherein said adjusting step (e) further comprises increasing the speed of said fluid pump if said system pressure is under said predetermined range of pressure.

12. The method of operating at least one fluid pump speed controller in accordance with claim 10, further comprising an adjustable frequency drive for driving said fluid pump at predetermined operating speeds.

13. The method of operating at least one fluid pump speed controller in accordance with claim 10, the steps further comprising:
  f) if more than one fluid pump is operational, determining if a principal one of said more than one fluid pump has been operating for more than a predetermined period of time; and
  g) designating one of said more than one fluid pump that is not said principal pump, as a substitute principal pump and designating said original principal pump as a backup pump.

14. The method of operating at least one fluid pump speed controller in accordance with claim 13, further comprising an adjustable frequency drive for driving said fluid pumps at predetermined operating speeds.

* * * * *